United States Patent [19]
Johnson et al.

[11] 3,732,956
[45] May 15, 1973

[54] OVERRUNNING CLUTCH WITH CENTERING MEANS AND UNIT HANDLED SUBASSEMBLY THEREFOR

[75] Inventors: Lawrence P. Johnson, Huron; Oscar G. Kitchin, Port Clinton, both of Ohio

[73] Assignee: General Motors Corporation, Detroit, Mich.

[22] Filed: Jan. 19, 1972

[21] Appl. No.: 219,078

[52] U.S. Cl. ................................................. 192/45
[51] Int. Cl. .......................... F16d 15/00, F16d 41/06
[58] Field of Search ...................... 192/45; 188/82.84

[56] References Cited

UNITED STATES PATENTS

| 2,973,847 | 3/1961 | Stockton | 192/45 |
| 3,055,472 | 9/1962 | Sauzedde | 192/45 |
| 3,087,588 | 4/1963 | Fischer | 192/45 |
| 3,500,977 | 3/1970 | Gehrke | 192/45 |

FOREIGN PATENTS OR APPLICATIONS

| 869,082 | 5/1961 | Great Britain | 192/45 |

Primary Examiner—Allan D. Herrmann
Attorney—J. L. Carpenter et al.

[57] ABSTRACT

An overrunning clutch is provided with a cage wound from a strip of sheet metal which carries a number of molded bearing blocks within the axial confines of the cage. The bearing blocks center the clutch races with respect to each other and also cooperate in providing a unit handled subassembly of caged rollers for the clutch.

5 Claims, 8 Drawing Figures

PATENTED MAY 15 1973　　　3,732,956

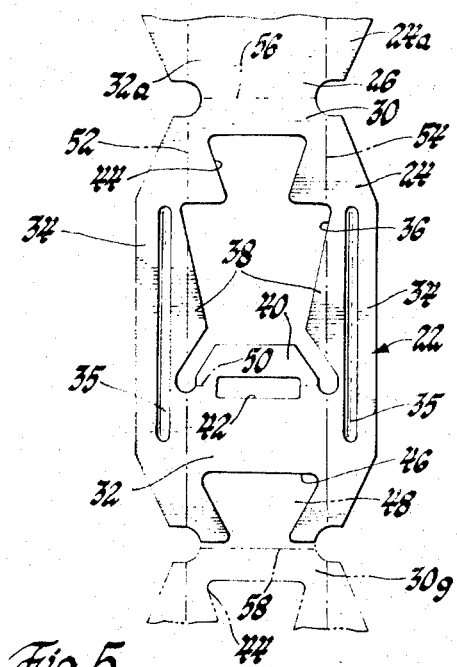

OVERRUNNING CLUTCH WITH CENTERING MEANS AND UNIT HANDLED SUBASSEMBLY THEREFOR

This invention relates generally to overrunning roller clutches and more particularly to such a clutch of the caged roller type.

In many instances, an overrunning roller clutch is required to be self-centering, that is, the clutch races must be centered on each other within the clutch itself.

In the past, the cage has been used to center one race on the other. These prior art cages consisted of a pair of spaced, stamped annular end rings and separate cross bars connected to the stamped end rings such as by staking over trunnions on the cross bars protruding through holes in the end rings. The end rings on such prior art devices included bent over flanges which provided the load carrying bearing surfaces which centered one of the clutch races on the other. Since the end rings provided the bearing surfaces, they were stamped from a relatively expensive material such as an aluminum clad steel. Moreover, the scrap from the manufacture of the end rings was high as the end rings are a relatively thin annulus stamped from a sheet of material considerably wider than the end ring diameter which increased the expense of such cages still further. Then too, the centering of one race on the other races depended not only on the manufacturing variations of the several parts of the cage but on the accumulated effect of these variations. Moreover, the bearing flanges on the cage were either bent inwardly and interrupted thereby reducing the available bearing surfaces area or if bent outwardly increased the width of the clutch.

It is broadly the object of this invention to generally improve upon self-centering overrunning clutch of the caged roller type by providing a less expensive clutch in which the races are accurately centered with respect to each other.

Another object of this invention is to provide a self-centering overrunning clutch of the caged roller type in which the cage can be made of an ordinary low carbon steel.

Another object of this invention is to provide an overrunning clutch which utilizes a relatively inexpensive wound strip type cage.

Still another object of this invention is to provide an overrunning clutch of the caged roller type in which one race is centered on the other without requiring an increase in the width of the races while still providing a substantial bearing surface area.

Yet another object of this invention is to provide an overrunning clutch of the caged roller type in which a relatively large radial load can be transferred from one race to the other.

Still yet another object of this invention is to provide an overrunning clutch of the caged roller type in which the centering of the races is provided by molded bearing members capable of inexpensive accurate manufacture.

Another object of this invention is to provide an overrunning clutch of the caged roller type in which the cage is centered between the races by a unit handled caged roller subassembly.

Another object of this invention is to provide an overrunning clutch in which the races are centered on each other by molded bearing blocks mounted on a cage wound from a sheet metal strip of relatively inexpensive material such as low carbon steel.

Another object of this invention is to provide a unit handled subassembly of caged rollers and bearing blocks for assembly into a roller clutch.

Yet another object of this invention is to provide an overrunning clutch of the caged roller type having a cage wound from a strip of sheet material in which molded bearing blocks are mounted on the cage in a simple and efficient manner to provide a unit handled caged roller subassembly and to center the clutch races when the subassembly is incorporated into the clutch.

Other objects and features of the invention will become apparent to those skilled in the art as the disclosure is made in the following detailed description of preferred embodiments of the invention as illustrated in the accompanying sheets of drawing in which:

FIG. 5 is a fragmentary plan view of the blank used in the manufacture of the cage shown in FIG. 1.

FIG. 6 is a fragmentary elevation of a strip used in the manufacture of the cage shown in FIG. 1 after additional processing steps have been performed on the blank shown in FIG. 5.

FIG. 7 is a fragmentary front view of a subassembly of the overrunning clutch shown in FIG. 1 illustrating its unit handled characteristics as a subassembly.

FIG. 8 is an enlargement of a portion of FIG. 1.

Figure 1:
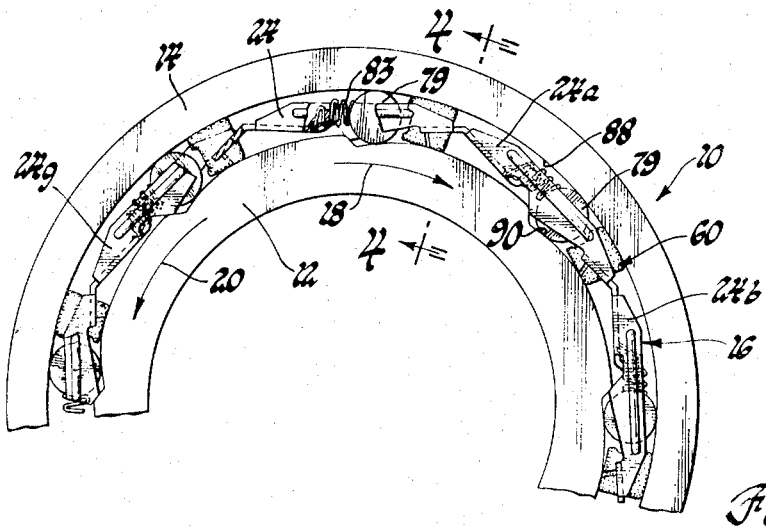
FIG. 1 is a fragmentary front view of an overrunning roller clutch in accordance with this invention.

Referring now to the drawings and more particularly to FIG. 1, this invention is directed to an overrunning roller clutch indicated generally at 10 comprising an inner race 12 and an outer race 14 having a caged roller subassembly indicated generally at 16 therebetween. The caged roller subassembly 16 cooperates with the races 12 and 14 to permit the races to rotate relative to one another in one direction while locking the races together in response to relative rotation in the opposite direction. For instance, in the clutch 10 illustrated in FIG. 1, the inner race 12 is freely rotatable in the clockwise direction relative to the race 14 as indicated by the arrow 18. On the other hand, relative rotation in the opposite direction indicated by the arrow 20 is prevented by the rollers locking the races together.

The subassembly 16 includes a cage 22 which is generally annular in form and is fabricated from a strip of sheet metal. Since economy is an important feature of this invention which is partially realized from the use of a sheet metal cage wound to annular form from a strip of sheet metal stock, the manufacture of the cage from the strip of sheet stock will briefly be described in connection with FIGS. 5 and 6.

Referring now to FIG. 5, a strip of relatively rigid but deformable sheet metal is blanked into a series of integrally connected segments. The typical segment 24 includes cross bar portions 30 and 32 interconnected by a pair of side pieces 34 to provide a roller receiving window 36. The side pieces 34 have teeth like projections 38 and may also include stiffening ribs 35. Protruding into the window 36 is a tab 40 connected to the cross bar portion 32 by the metal strips at the sides of an elongated aperture 42. A key slot 44 in the cross bar portion 30 opens into the window 36 at the end of the window opposite the tab 40.

The segment 24 is connected to adjacent segment 24a by the cross bar 26 which comprises cross bar portion 30 of the segment 24 and cross bar portion 32a of the adjacent segment 24a. The adjacent segment 24a is likewise connected to a like segment 24b (shown in FIG. 1) and so on providing a strip comprising the requisite number of like segments except that the end segments are preferably modified to provide a dove tail or similar interlock when the strip is subsequently wound to annular form.

In FIG. 5, the end segment 24 is shown as having a dovetail slot 46 in its cross bar portion 32 which receives the dovetail 48 on cross bar portion 24g on the opposite end segment which has been broken away and repositioned to show the interlock feature. After the segment 24 shown in FIG. 5 is blanked, certain portions of the segment are bent. More specifically, the tab 40 is bent into an upright position along the line 50 and the side pieces are bent upright along the lines 52 and 54 respectively. The segment 24 after these bends have been made is shown in section in FIG. 6. After all the segments in the strip are bent to the form shown in FIG 6, the strip is bent to annular form by bending each cross bar, for instance at the line 56 on cross bar 26 shown in FIG. 5 which produces a cross bar comprising angled portions 30 and 32a. (See FIG. 7). The segment 24 being an end segment requires no bending in its cross bar portion 32. However, the dovetail 48 on the opposite end segment 24g is bent along the line 58 where the cross bar portions 32 and 30g meet so that when the ends are joined the cross bar resulting from portions 32 and 30g is likewise angled.

While the above description has been brief, it is considered sufficient to enable anyone skilled in the art to fabricate a suitable cage from sheet metal strip material in either distinct stages or with a progressive die forming technique.

Figure 2:
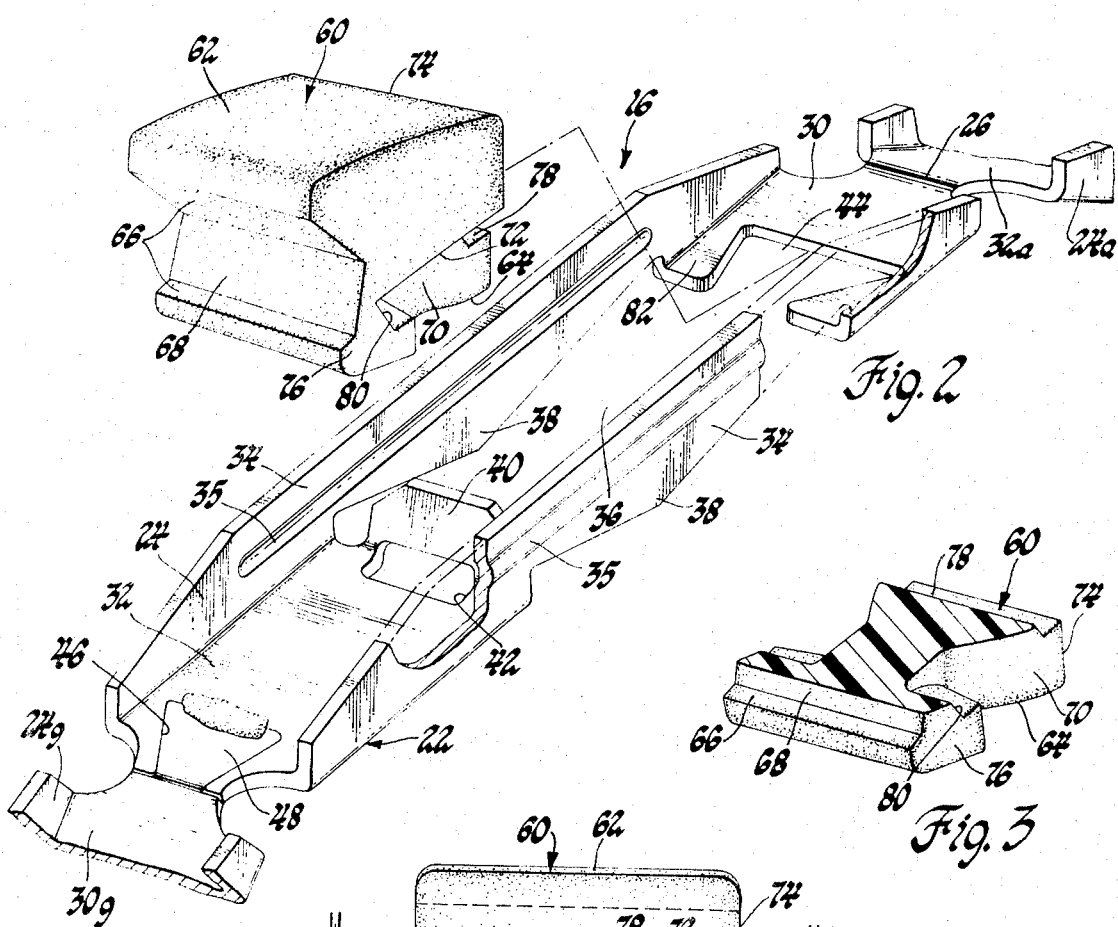
FIG. 2 is an enlarged exploded view of a bearing block and a portion of the cage shown in FIG. 1.
Figure 3:
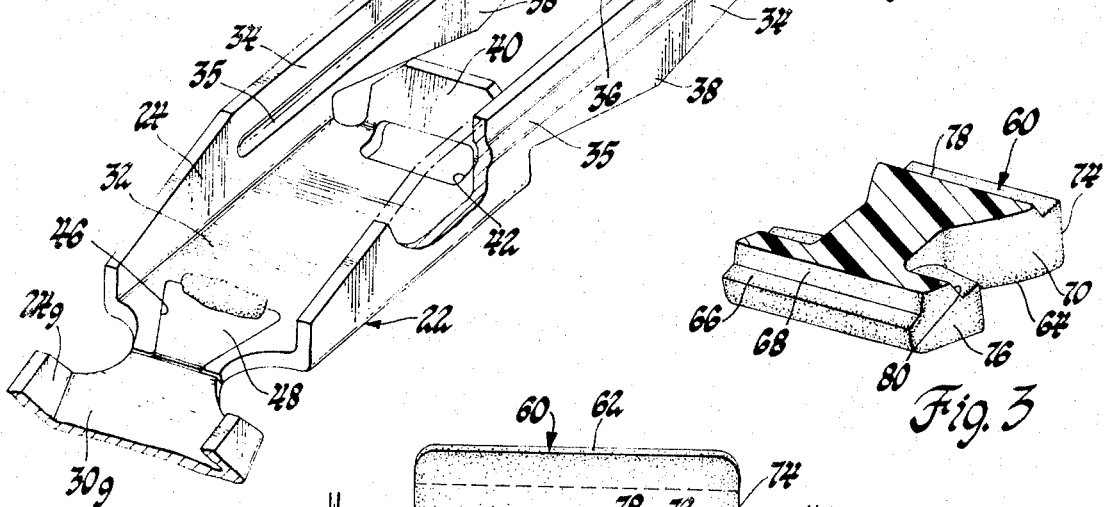
FIG. 3 is a perspective view of the bearing block shown in FIG. 2 sectioned along the plane 3—3 shown in FIG. 4.

Referring now to FIG. 2, the relationship of a typical bearing block 60 and a typical cage segment, such as segment 24, will now be explained. The bearing block 60 has arcuate bearing surfaces 62 and 64 at its top and bottom respectively. The front face of the bearing block includes a flared channel providing flat canted walls 66 which are adapted for tangential line contact with a roller while spacing the roller from the end wall 68 of the channel. (See FIG. 7). A key 70 on the bearing block 60 extends from the bottom bearing surface 64 to a forwardly sloping ledge 72. The key 70 extends forwardly from the rear face 74 to wings 76 which are coextensive with the bearing block 60. The rear face 74 of the bearing block 60 and the rear faces of the wings 76 have axial grooves 78 and 80 respectively which slope forwardly and have their top walls coplanar with the ledge 72. FIG. 3 is perspective of the bearing block 60 sectioned at the plane containing the ledge 72 and top walls of the grooves 78 and 80 and shows the outline of the key 70 which matches the outline of the key slot 44.

Figure 4:
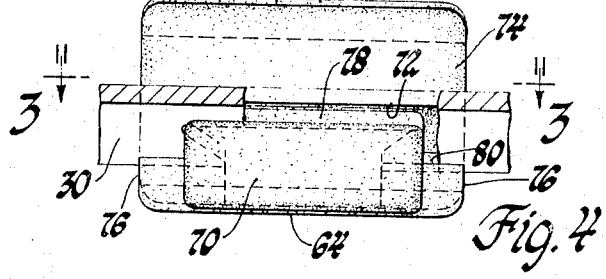
FIG. 4 is a section taken substantially along the line 4—4 of FIG. 1 showing the relationship between the cage and the bearing block when the bearing block is mounted on the cage.

The bearing block 60 is mounted on the segment 24 by generally a radial insertion of the bearing block 60 into the key slot 44 and rear portion of the window 36 of the cage segment 24 until the ledge 72 bears on the margin 82 of the key slot 44 as shown in FIG. 2. The insertion is possible because the key 70 fits in the key slot 44 and the wings 76 fit in the rear portion of the window 36. After insertion, the bearing block 60 is indexed rearwardly disposing portions of the key hole margin 82 in the grooves 78 and 80 to lock the bearing block 60 radially on the segment 24. FIG. 4 is a rear view of the bearing block 60 after it has been inserted into the cage window 36 and key slot 44 and indexed rearwardly and shows portions of the key slot margin 82 disposed in the grooves 78 and 80. The bearing blocks 60 are economically and accurately molded from any suitable moldable material having the requisite strength and good bearing qualities, such as a fiber filled nylon. It is to be noted that the bearing block 60 is designed for an axial draw mold in which the bearing block contours and grooves can be provided by the axial insertion and withdrawal of dies into and out of a die cavity.

Referring now to FIG. 7, a fragmentary front view of the unit handled subassembly 16 is shown. The subassembly 16 includes the generally annular cage 20 having a plurality of circumferentially spaced roller receiving windows 36 and a bearing block 60 associated with each window 36 mounted on the cage by a generally radial insertion and rearward index as previously described. Disposed in each window is a roller 79 and an accordion spring 83. Since all of the parts and their association with each segment of the cage are typical, the illustration of the single segment 24 and its associated parts in FIG. 7 is sufficient. The accordion spring 83 is mounted on the tab 40 by inserting the end 81 thereof through the aperture 42 and snapping the detent 84 past the edge of the aperture 42. The opposite end of the spring 83 terminates in cradle 86 which engages the roller 79 and biases the roller 79 into line contact with the walls 66 on the bearing block 60 which in turn retains the bearing block 60 in its indexed rear position. Thus, the roller 79 and bearing block 60 are both radially fixed on the cage 22 thereby providing a unit handled subassembly 16. The unit handled subassembly is a feature of this invention enabling the parts to be assembled as a unit to the races 12 and 14 to complete the overrunning clutch.

An enlarged view of a portion of the assembled roller clutch is shown in FIG. 8. In the completed roller clutch, the typical roller 79 engages the cylindrical surface 88 on the race 14 and the cam 90 on the inner race 12. The cam 90 slopes inwardly from a parti-cylindrical outer surface 92 centered from the center of the inner race 12. The bottom of the cam 80 is contiguous with a shoulder 94 which slants outwardly to a particylindrical surface of the same radius as surface 92 with the result that the inner race has an interrupted series of particylindrical surfaces 92. The function of the cam 90 in locking the races 12 and 14 through the rollers 79 in one direction (for instance, counterclockwise rotation of the inner race 12 while outer race 14 is held as shown by the arrow 20) while allowing overrunning in the opposite direction (for instance, clockwise rotation of the inner race 12 as shown by the arrow 18 while outer race 14 is held) is well known as is the function of the cage projections 38 which engage the shoulders 94 to cause the cage 22 to remain stationary with respect to the inner race 12 during a freewheeling or overrunning mode of operation.

The centering of one race on the other, however, is accomplished in a new and unique manner by the bearing blocks 60 which have their respective bearing surfaces 64 engaging the parti-cylindrical surfaces 92 on the inner race and their respective outer bearing surfaces 62 engaging the cylindrical surface 88. The concentricity between the races is dependent on the dimensions maintained on the several bearing blocks between the bearing surfaces 62 and 64 and the accuracy of these surfaces. Such dimensions and accuracies are obtainable economically from a molding process, and thus, the molded bearing block improves the centering accuracy of a clutch in accordance with this invention. In this regard, the fit of the margins 82 of each of the key holes 44 in the grooves 78 and 80 is sufficiently loose so that the manufacturing variations in the cage 22 do not effect the centering of the races. On the other hand, the play between the bearing blocks 60 and the cage 22 is limited so that the bearing blocks are confined circumferentially within limits with respect to the inner race so that there is always adequate engagement between the bearing surface 64 on the bearing blocks 60 and the parti-cylindrical surface 92 on the inner race 12. It is to be noted that the bearing blocks 60 are substantially coextensive with the cage, and thus, provide relatively large bearing surfaces without increasing the cage width. The increased bearing surface area results in an increased radial load capacity through the clutch.

When assembled to the races, the roller 79 may be spaced from the face of bearing block 60 because of the required ramp angle of the cam 90 as shown in FIG. 8. In such instances, the cage 22 retains the bearing blocks 60 in their indexed position. The cross bar portion 30 of the angled cross bar 26 which carries the bearing block 60 slopes inwardly toward the inner race 12. This sloping orientation in combination with the sloping orientation on the grooves 78 in the key 70 and the grooves 80 in the wings 76 of the bearing block serves to substantially retain the bearing block in its indexed position in the absence of the spring biased roller performing this function.

It is also to be noted that the cage 20 is substantially radially located between the races by the low friction bearing blocks 60 with the result that the metal cage 20 engages only the shoulders 94 on the inner race 12 thus minimizing metal-to-metal contact and reducing the wear associated therewith. The reaction ears 38 on cage 20 engaging the shoulders 94 on the inner race 12 influences the radial location of the cage 20 to some extent within the confines of the loose fit of the cage margins 82 within the grooves 78 and 80, but it is the bearing blocks 60 which provide the significant radial location of the cage 20.

We wish it to be understood that we do not desire to be limited to the exact details of construction shown and described, for obvious modifications will occur to a person skilled in the art.

We claim:

1. A unit handled subassembly for an overrunning clutch having a first race with a circumferential surface having a plurality of circumferentially spaced cams thereon, a second race with a cylindrical surface confronting said circumferential surface on said first race and a complement of rollers engaging said cams and said cylindrical surface comprising, an annular cage wound from a strip of sheet metal, said cage having a plurality of circumferentially spaced windows individually receiving said rollers and a plurality of key slots opening into said windows, a plurality of bearing blocks extending through said windows and said key slots, said bearing blocks having radially spaced bearing surfaces which are adapted to engage said circumferential surface and said cylindrical surface respectively to center one of said races on the other of said races, keys on said bearing blocks extending from one of said bearing surfaces to enlarged portions forming ledges which overlap said key slots on the side of said cage remote from said one bearing surface on said bearing blocks whereby said bearing blocks are insertable into said key slots in a generally radial direction, roller engaging surfaces on said bearing blocks, axial groove means in said bearing blocks opening away from said roller engaging surfaces, said axial groove means being aligned with portions on said cage adjacent said key slots when said bearing blocks have said key portions disposed in said key slots and said ledges engaging said cage whereby said bearing blocks are indexable to an interlock position where said axial groove means receive portions of said cage adjacent said key slots, and a plurality of springs mounted on said cage and engaging said rollers, said springs biasing said rollers into said roller engaging surfaces on said bearing blocks and maintaining said bearing blocks in said interlock position in the absence of said races whereby said rollers, springs, cage and bearinG blocks are a unit handled subassembly.

2. An overrunning roller clutch comprising, a first race having a circumferential surface which includes a plurality of circumferentially spaced cams interposed with a plurality of parti-cylindrical surfaces, a second race having a cylindrical surface confronting said circumferential surface on said first race, a complement of rollers engaging said cams and said cylindrical surface, an annular cage wound from a strip of sheet metal, said cage having a plurality of circumferentially spaced windows individually receiving said rollers and a plurality of key slots converging toward and opening into said windows, a plurality of low friction, molded bearing blocks extending through said windows and key slots, said bearing blocks having radially spaced bearing surfaces engaging said particylindrical surfaces and said cylindrical surface respectively to center one of said races on the other of said races, means to cause said cage to remain stationary with respect to said first race when said clutch is overrunning, and said bearing blocks having keys disposed in said key slots which maintain said bearing blocks in engagement with said parti-cylindrical surfaces when said first race is overrunning.

3. An overrunning roller clutch comprising, a first race with a circumferential surface having circumferentially spaced cams thereon, a second race having a cylindrical surface confronting said circumferential surface on said first race, an annular cage wound from a strip of sheet metal having a plurality of circumferentially spaced cross bars comprising angled first and second generally flat portions, said second portions sloping toward one of said races, a plurality of pairs of spaced integral side pieces connecting said first portions on said cross bars to said second portions on adjacent cross bars to form windows between said cross bars, a complement of rollers individually disposed in said windows and engaging said cams and said cylindrical surface, springs mounted on said first portions of said cross bars and engaging said rollers, slots in said second portions of said cross bars opening into said windows, and a plurality of bearing blocks extending through said slots and said windows, said bearing blocks having radially spaced bearing surfaces which engage said circumferential and cylindrical surfaces respectively to center one of said races on the other of said races, said bearing blocks having spaced groove means sloping toward said one race, said second portions having margins adjacent said slots disposed in said groove means limiting the circumferential movement of said bearing blocks with respect to said cage to the small extent determined by the fit between said margins and said spaced groove means when said cage is disposed between said races whereby said bearing blocks are substantially fixed on said cage and said cage is substantially centered on said bearing blocks.

4. An overrunning roller clutch comprising, a firSt race with a circumferential surface having circumferentially spaced cams thereon, a second race having a cylindrical surface confronting said circumferential surface on said first race, an annular cage wound from a strip of sheet metal having a plurality of circumferentially spaced cross bars, side pieces connecting said cross bars to form roller windows receiving a complement of rollers individually disposed in said windows and engaging said cams and said cylindrical surface, springs mounted on said cross bars and extending into one end of said windows into engagement with said rollers, key slots in said cross bars opening into the opposite end of said windows, a plurality of bearing blocks extending through said windows, said bearing blocks being of substantially the same width as said windows and having radially spaced bearing surfaces which engage said circumferential and cylindrical surfaces respectively to center one of said races on the other of said races, ledges on said bearing blocks, keys on said bearing blocks extending from one of said bearing surfaces to said ledges on said bearing blocks, said keys being disposed in said key slots and limiting the circumferential movement of said bearing blocks into said windows, said ledges overlying said key slots and engaging the margins of said key slots on the side remote from said one bearing surface, and circumferentially spaced axial grooves in said bearing blocks, said grooves having surfaces coplanar with said ledges and embracing said cross bars.

5. An overrunning clutch comprising, a first race having a circumferential surface including a plurality of cams having shoulders contiguous with one end thereof and parti-cylindrical surfaces contiguous with the other end thereof, a second race having a cylindrical surface confronting said circumferential surface on said first race with an annular space therebetween, the space between said cams and said cylindrical surface diminishing from said one end of said cams to said other end of said cams, an annular cage wound from a strip of sheet metal disposed between said races, said cage having a plurality of circumferentially spaced cross bars comprising angled first and second generally flat portions, a plurality of pairs of spaced bent-up integral side pieces connecting said first angled portions of said cross bars to said second angled portions of adjacent cross bars to form roller receiving windows, projections on said side pieces engaging said shoulders on said first race, key slots in said second portions of said cross bars opening into said windows, said second portions sloping toward one of said races, a plurality of bearing blocks having radially spaced bearing surfaces engaging said parti-cylindrical surfaces and said cylindrical surface respectively, said bearing blocks having keys extending from one of said bearing surfaces to a ledge sloping toward said one race, said key portions being disposed in said key slots and said ledge overlying said key slots on the side of said cage remote from said one race, wings on said bearing blocks disposed in said windows, spaced axial groove means in said wings and said keys respectively, said spaced axial groove means having sloping surfaces coplanar with said ledge and surfaces parallel thereto, said second portions of said cross bars having margins adjacent said key slots disposed in said spaced axial groove means and engaging said ledge whereby said bearing blocks are circumferentially spaced by said cage and center said cage between said races, and a plurality of rollers individually received in said windows and engaging said cams and said cylindrical surface on said races, springs mounted on said first portions of said cross bars, said springs engaging said rollers and urging them toward said bearing blocks.

* * * * *